United States Patent
Matsui

(10) Patent No.: US 6,982,749 B2
(45) Date of Patent: Jan. 3, 2006

(54) REMOTE CONTROL CAMERA SYSTEM AND IMAGE TRANSMISSION METHOD

(75) Inventor: Naoki Matsui, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 845 days.

(21) Appl. No.: 09/781,235

(22) Filed: Feb. 13, 2001

(65) Prior Publication Data

US 2004/0201713 A1 Oct. 14, 2004

(30) Foreign Application Priority Data

Feb. 18, 2000 (JP) ............................ P2000-041026

(51) Int. Cl.
*H04N 5/225* (2006.01)

(52) U.S. Cl. ...................... 348/218.1; 348/36; 348/39; 348/211.12

(58) Field of Classification Search ................ 348/36, 348/38, 39, 211.99, 211.3, 211.9, 211.7, 207.11, 348/218.1, 143, 345, 211.11, 211.13, 211.12, 348/211.14

See application file for complete search history.

(56) References Cited

U.S. PATENT DOCUMENTS

| | | | | |
|---|---|---|---|---|
| 5,563,658 A | * | 10/1996 | Parulski et al. | 348/350 |
| 5,920,349 A | * | 7/1999 | Okino et al. | 348/354 |
| 6,034,716 A | * | 3/2000 | Whiting et al. | 348/36 |
| 6,356,297 B1 | * | 3/2002 | Cheng et al. | 348/36 |
| 6,477,312 B1 | * | 11/2002 | Houston | 386/46 |
| 6,587,597 B1 | * | 7/2003 | Nakao et al. | 382/284 |
| 6,714,249 B2 | * | 3/2004 | May et al. | 348/373 |
| 6,795,113 B1 | * | 9/2004 | Jackson et al. | 348/143 |

FOREIGN PATENT DOCUMENTS

JP 10-191143 7/1998

* cited by examiner

*Primary Examiner*—Thai Tran
*Assistant Examiner*—Gary C. Vieaux
(74) *Attorney, Agent, or Firm*—McDermott Will & Emery LLP

(57) ABSTRACT

A live camera whose image pickup direction is remote-controlled is utilized, and a plurality of frames picked up in different pickup directions are composed so as to generate a composite image, and this is stored in a memory. Upon request from the user for altering the pickup direction, in the composite image within the memory, an extraction area is shifted in the horizontal direction and vertical direction in response to the request for alteration in a manner so as to correspond to a pickup image in the live camera, and the image within the extracted area is transmitted to the user. This arrangement eliminates the necessity of altering the pickup direction of the live camera mechanically, and independent of the mechanical alteration, only the electrical image processing of the composite image is carried out, with the result that the user is allowed to feel as if he or she were actually operating the live camera. In other words, even if a plurality of users request to alter the pickup direction, one live camera can deal with these requests; therefore, it is possible to effectively utilize the live camera, and consequently to construct a remote control camera system at low costs.

2 Claims, 18 Drawing Sheets

REMOTE CONTROL CAMERA SYSTEM AND IMAGE TRANSMISSION METHOD

This application is based on application No. 2000-041026 filed in Japan, the contents of which are hereby incorporated by reference.

BACKGROUND OF THE INVENTION

1. Field of the Invention

The present invention relates to a remote control camera system which displays images picked up by a camera through the Internet, and also concerns an image transmission method for such a system.

2. Description of the Background Art

There have been many cases in which various companies place Internet live cameras in their own buildings, showrooms, sightseeing spots, etc. and provide images on their home page so as to introduce their companies and enhance advertising campaigns.

Moreover, there have been many monitoring systems in which monitoring cameras, etc. are connected to the Internet and these images are monitored from a remote place.

In these cases, with respect to functions of the remote control cameras such as the Internet live cameras and monitor cameras, it is necessary to provide a remote controlling operation for directing the camera in a direction desired by the user; however, one camera is not capable of dealing with a plurality of accesses.

In particular, with respect to sites which transmit video images of the Internet live cameras that can be remote-controlled by a predetermined user, those sites having many accesses have a plurality of live cameras; however, one live camera only deals with one access, with the result that the live cameras are not effectively utilized.

Moreover, the installation of a number of Internet live cameras results in installations of computers (servers) and necessitates the constant connections of the respective cameras to the Internet, causing high installation costs.

SUMMARY OF THE INVENTION

The present invention relates to a remote control camera system.

In accordance with the present invention, this system is provided with: (a) an image pickup device; (b) a changing element for changing a pickup direction of the image pickup device; (c) a composing element for forming composite image information by composing a plurality of pieces of image information picked up by the image pickup device in different image pickup directions; (d) a memory for storing the composite image information; (e) an extraction element for forming extracted image information derived from the composite image information in response to a request from outside; and (f) an output device for outputting the extracted image information. Therefore, it is possible to effectively utilize the remote control cameras and also to construct a remote control camera system at low costs.

In one preferred embodiment of the present invention, the composite image information is information formed by continuously composing the plurality of pieces of image information. Consequently, the extraction of image from the composite image information is easily made.

Moreover, the present invention also relates to an image transmission method.

Therefore, the objective of the present invention is to effectively utilize the remove control cameras, and also to provide a remote control camera technique at low costs.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>

<Essential Structure of a Remote Control Camera System>

Figure 1:
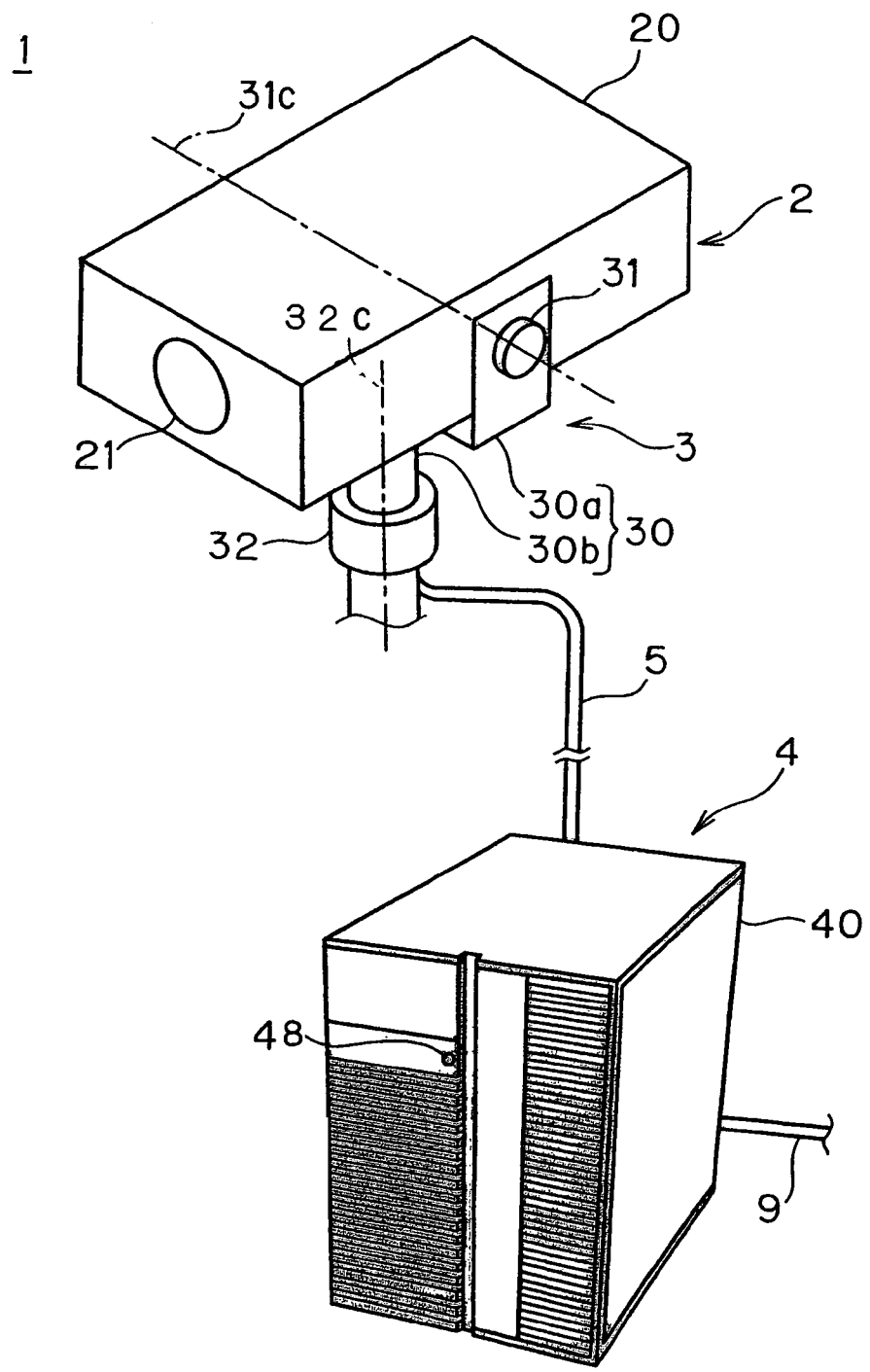
FIG. 1 is a perspective view that shows an essential structure of a remote control camera system in accordance with the first preferred embodiment of the present invention.

FIG. 1 is a perspective view that shows an essential structure of a remote control camera system 1 in accordance with the first preferred embodiment of the present invention. A remote control camera system 1 is provided with a live camera 2, a direction-altering section 3 for altering the image pickup direction of the live camera 2, a server 4 for controlling these, and a cable 5 for electrically connecting the live camera 2 and the direction-altering section 3 to the server 4.

The live camera 2 has a casing 20 having a box shape, and a disc-shaped transparent pickup window 21.

The direction-altering section 3 is provided with a rotation driving mechanisms 31, 32 for altering the pickup direction of the live camera 2 and a holding member 30 that are connected to these and supports the live camera 2.

The rotation driving mechanism 31 carries out rotation of the live camera 2 in a direction for angles of elevation around a shaft 31c.

The rotation driving mechanism 32 also carries out rotation of the live camera 2 in the horizontal direction around a shaft 32c.

The holding member 30 is provided with a member 30a having its two ends bent vertically and a member 30b that is connected to the center of the member 30a. Here, the rotation driving mechanism 31 is attached to the two ends of the member 30a, and the rotation driving mechanism 32 is attached to the end of the member 30b. With this arrangement, with respect to the alternation of the pickup direction, the live camera 2 is allowed to have two degrees of freedom.

The server 4 has a casing 40 having an approximate box shape, and a lamp 41 for indicating the operational state, etc. is attached to the front face of the casing 40. Moreover, a communication line 9 for transferring data to the user, etc. is connected to the server 4.

Figure 2:
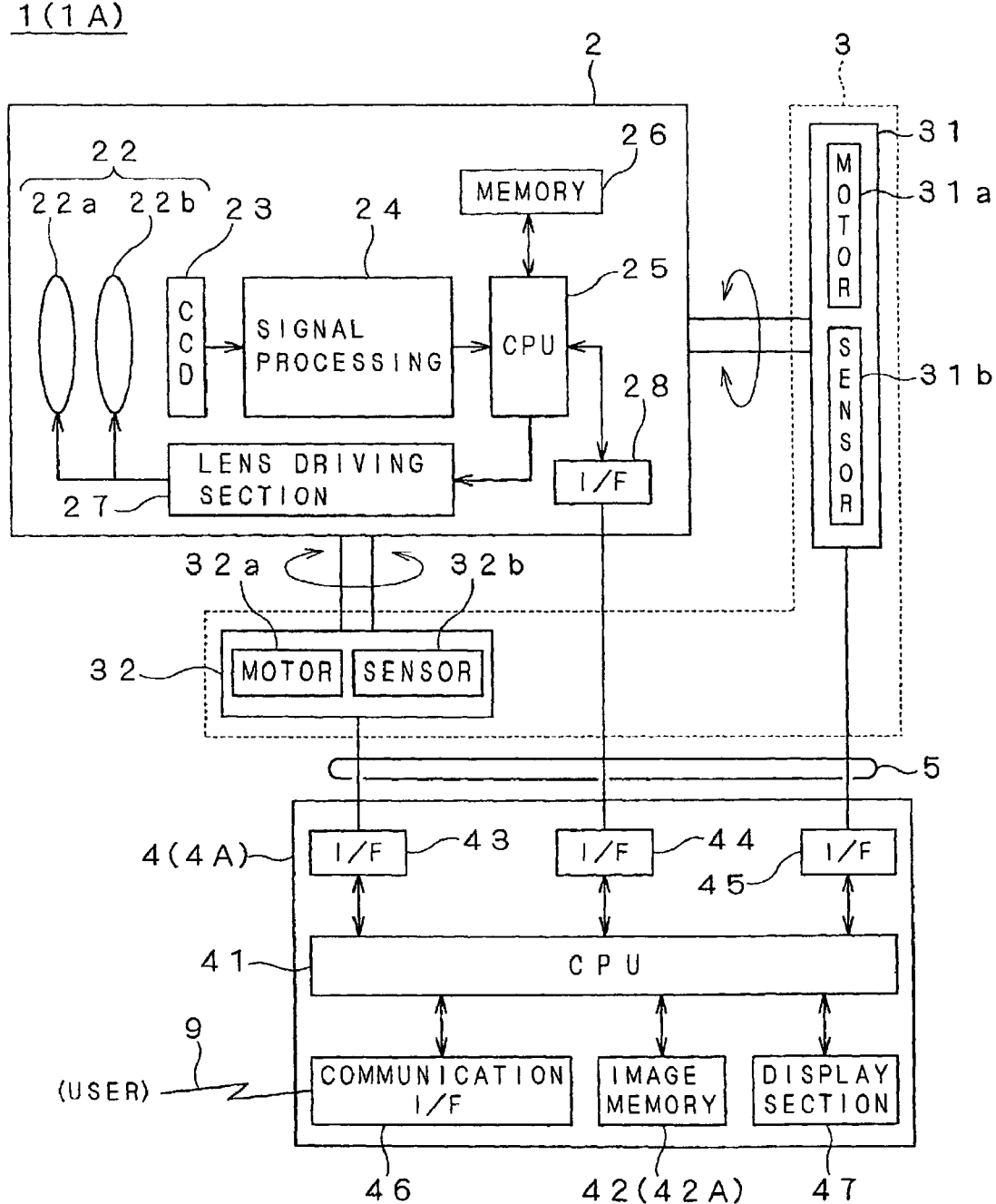
FIG. 2 is a block diagram that shows a functional construction of the remote control camera system.

FIG. 2 is a block diagram that shows a functional construction of the remote control camera system 1.

The live camera 2 has a construction using CCD 23 that are solid state imaging devices. The CCD 23 converts a subject image that is formed by a lens section 22 placed in the recessed place of the image pickup window 21 into an analog signal, and outputs this to a signal processing section 24. The lens section 22 is provided with a zoom lens 22a and a focus lens 22b. After eliminating noise, etc. from the analog signal output from the CCD 23, the signal processing section 24 subjects this to an A/D conversion, and then outputs the resulting digital image signal to the CPU 25.

A CPU 25 carries out various processes such as a white balancing process on the digital image signal while utilizing a memory 26. Moreover, the CPU 25 is electrically connected to a lens driving section 27 having a motor, and the zoom lens 22a and the focus lens 22b are allowed to shift respectively by instructions from the CPU 25 to the lens driving section 27 so that an altering process of the zoom ratio and a focusing process are carried out on the subject. Moreover, an interface 28 is electrically connected to the CPU 25 so that the digital image signal is transferred to the server 4 through this interface 28.

The rotation driving mechanism 31 is provided with a motor 31a serving as an actuator for rotating the live camera 2 around the rotation shaft 31c and a sensor 31b for detecting the rotation angle. With this construction, the motor 31a is allowed to have the fed-back angular information from the sensor 31b so that the rotation angle is set to a target value.

Moreover, the rotation driving mechanism 32 is also provided with a motor 32a serving as an actuator for rotating the live camera 2 around the rotation shaft 32c and a sensor 32b for detecting the rotation angle. With this construction, it is possible to set the rotation angle to a target value in the same manner as the rotation driving mechanism 31.

The server 4 is provided with a CPU 41 for carrying out a composing process (which will be described later), etc. on pickup images and an image memory 42 for storing the resulting composite image, etc. Interfaces 43, 44 and 45 are electrically connected to the CPU 41 so that signal transmission and receipt are carried out among the CPU 41, the live camera 2 and the direction-altering section 3 through the interfaces 43, 44 and 45. Moreover, the server 4 is provided with a communication-use interface 46 for receiving an access from the user and for transmitting the digital information, and a display section 47 such as a lamp 48.

The cable 5 serves as a signal line for transferring signals to the live camera 2 and the direction-altering section 3, and a power supply line for supplying driving power.

<Operation of the Remote Control Camera System 1>

Figure 3:
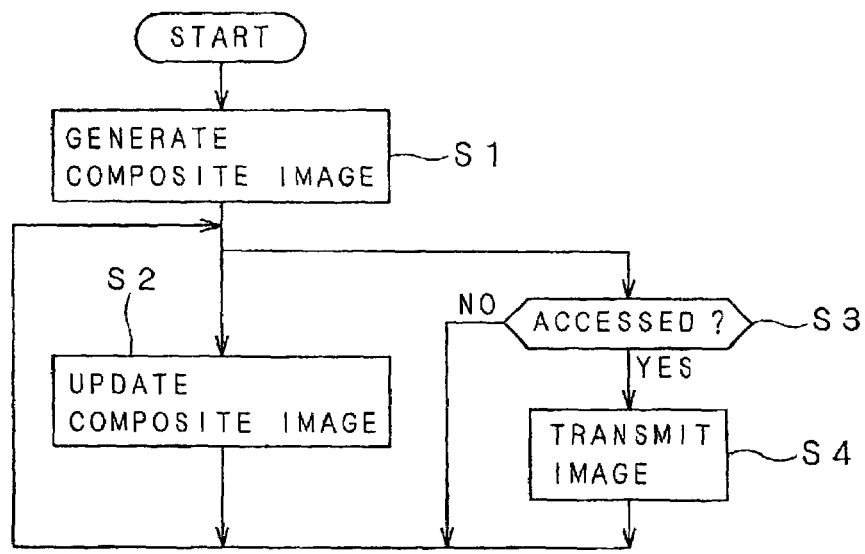
FIG. 3 is a flow chart that explains the outline of the basic operation of the remote control camera system.

FIG. 3 is a flow chart that explains the outline of the basic operation of the remote control camera system 1. Here, with respect to the operation of the remote control camera system 1, the CPU 41 of the server 4 automatically executes it, and detailed explanations of the following steps S1, S2 and S3 will be given later.

First, as step S1, a composite image is formed by composing a plurality of images picked up by the live camera 2.

At step S2, a composite image within the image memory 42 in the server 4 is updated by the composite image that has been formed by composing the images picked up by the live camera 2.

At step S3, a judgment is made as to whether or not an access is made to the server 4 from the user, that is, as to whether or not there is any input to the remote control camera system, through the communication line 9. Here, if there is any access, the sequence proceeds to step S4.

At step S4, in response to a request from the user, an image extracted from the composite image is transmitted, that is output to the communication line 9.

<Operation of Composite Image Generation>

Figure 4:
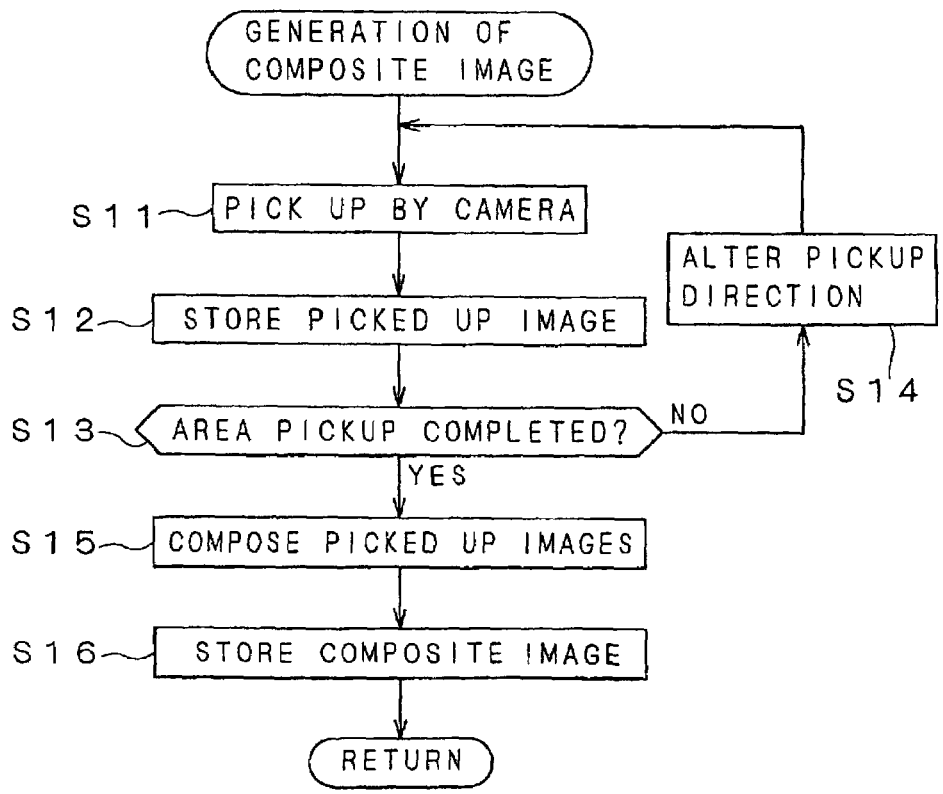
FIG. 4 is a flow chart that explains the operation of a composite image generation.

FIG. 4 is a flow chart that explains the operation of a composite image generation. Moreover, FIG. 5 is a conceptual drawing that explains the composite image generation.

Figure 5:
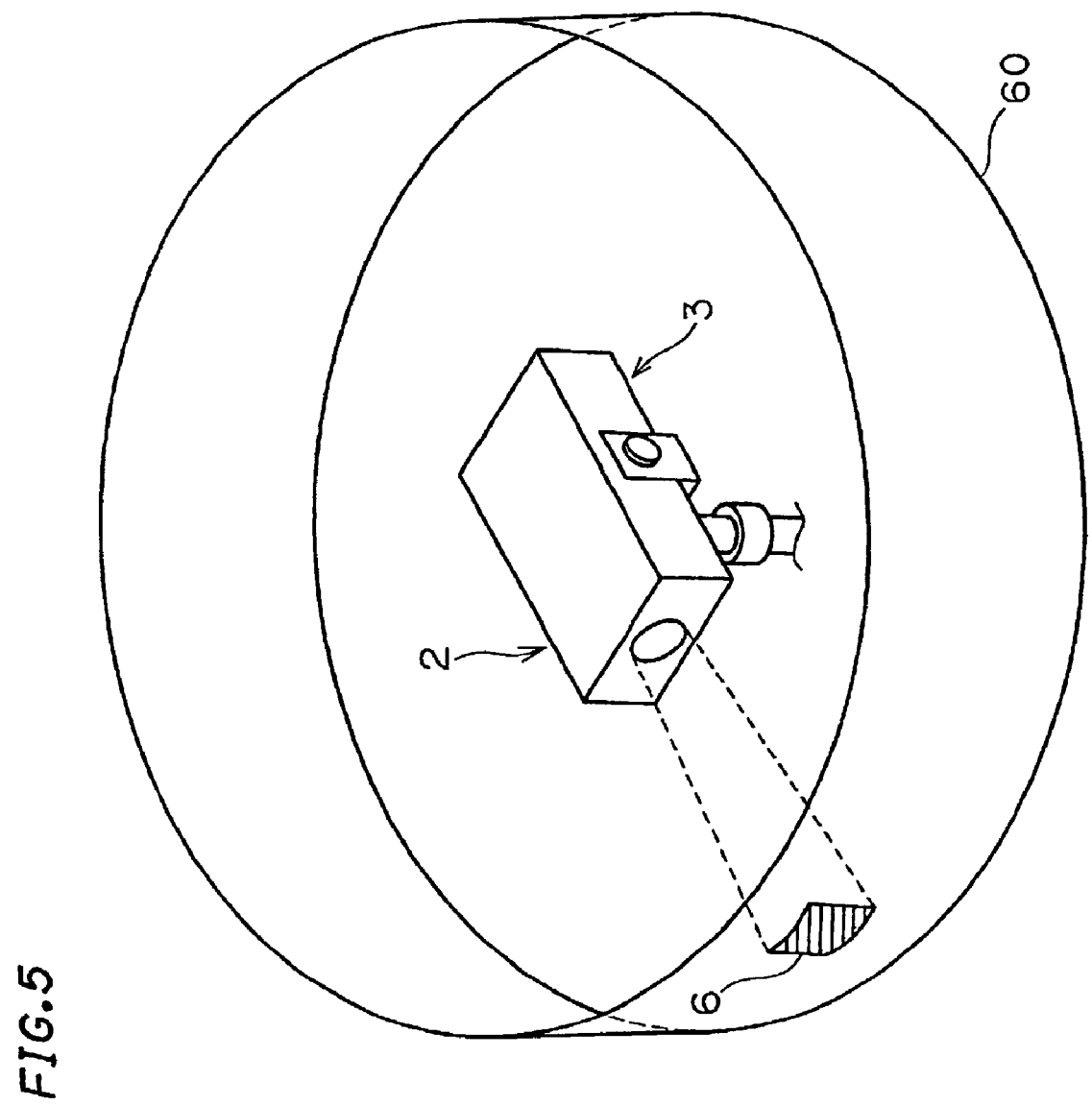
FIG. 5 is a conceptual drawing that explains the composite image generation.

At step S11, one frame 6 as shown in FIG. 5 is picked up by the live camera 2.

At step S12, the frame 6 thus picked up is stored in the image memory 42 of the server 4.

At step S13, with respect to an image-pickup area 60 schematically shown by a cylindrical projection area in FIG. 5, a judgment is made as to whether or not an image-pickup operation has been completed by the live camera 2. The image-pickup area 60 is preliminarily set by taking into consideration the movable area of the direction-altering section 3. In the case when the area image-pickup operation has been completed, the sequence proceeds to step S15, and if it has not been completed, then the sequence proceeds to the step S14.

At step S14, the direction-altering section 3 is driven so that the pickup direction of the live camera 2 is altered.

At step S15, a plurality of images that have been picked up in different directions are formed into a composite image that corresponds to the continuous pickup area 60 shown in FIG. 5 (which will be described later).

At step S16, the composite image that has been composed in step S15 is stored in the image memory 42 of the server 4.

<Detailed Description of an Image Composing>

An explanation will be given of an example of a method by which, at step S15, based upon a plurality of frames 6 picked up by the live camera 2, a composite image corresponding to the image-pickup area 60 is generated.

Figure 6A:
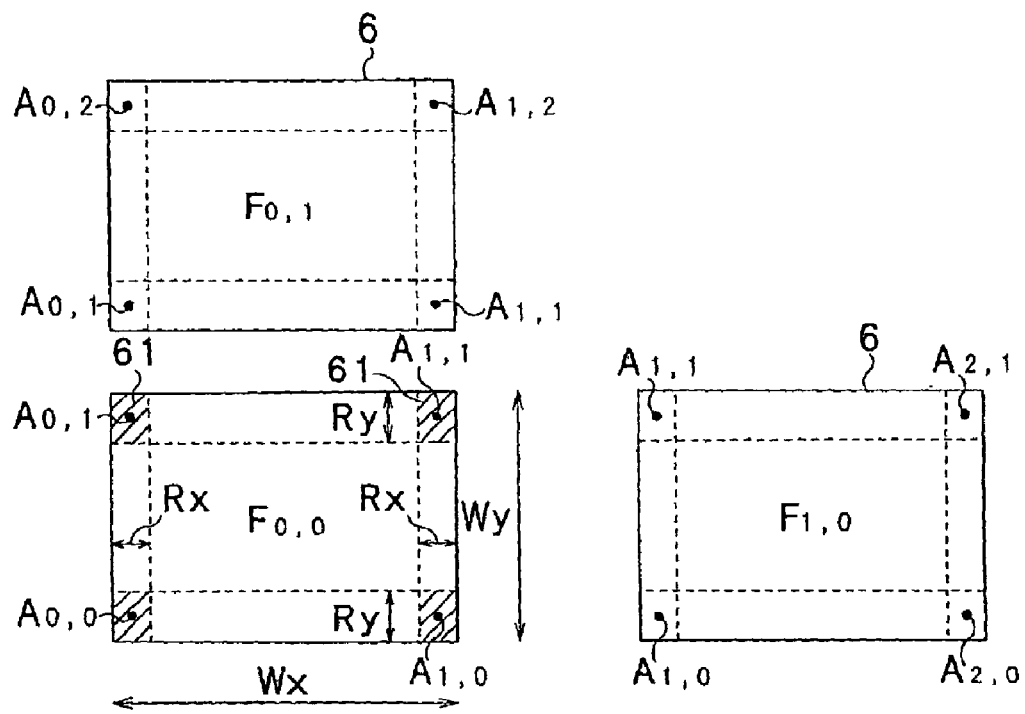
FIGS. 6A and 6B are drawings that explain a composing process of a frame.
Figure 6B:
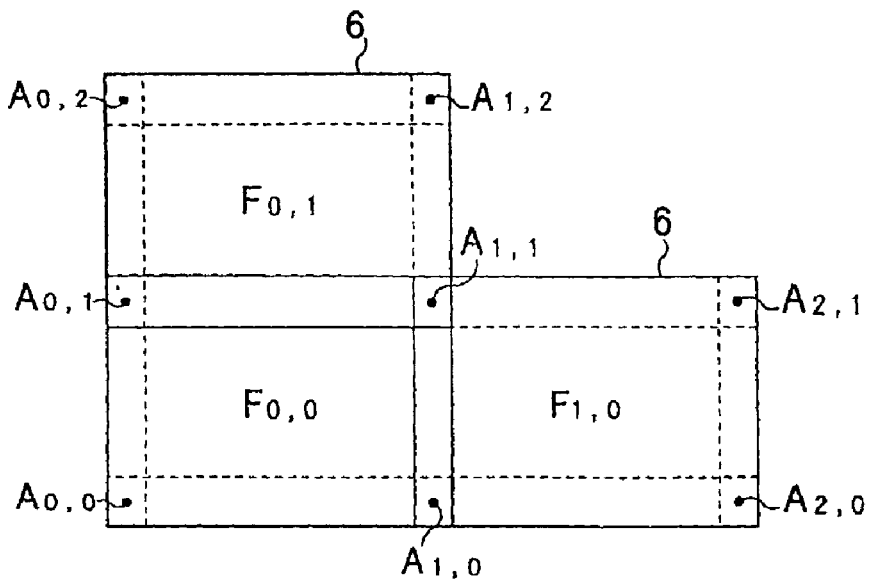

FIGS. 6A and 6B are drawings that explain a composing process of a frame 6.

The frame 6 forms an image corresponding to the width Wx with a pickup angle of 33° in the horizontal direction of the live camera 2 and the width Wy with a pickup angle 22° in the vertical direction of the live camera 2. Moreover, each of right and left edges Rx with a pickup angle of 3° of the frame 6 and each of upper and lower edges Ry with a pickup angle of 4° of the frame 6 are allowed to serve as overlapping portions that are used when the respective frames 6 are joined to each other.

As illustrated in FIG. 6A, each frame 6 is provided with overlapped areas 61 (parallel portions indicated by slanting lines) on its four corners at which the four frames 6 are joined to one after another. The frames 6 are superposed so as to make the center pixels ($A_{0,0}$, $A_{0,1}$, $A_{1,0}$, $A_{1,1}$, etc.) in these areas 61 coincident with each other; thus, positioning processes are virtually carried out so as to compose the respective frames 6 (see FIG. 6B).

Then, after the respective frames 6 have been virtually positioned, in order to improve the precision in the corresponding areas 61 of the respective frames 6 are pattern-matched so as to carry out the positioning correction for the respective frames 6.

Figure 7A:
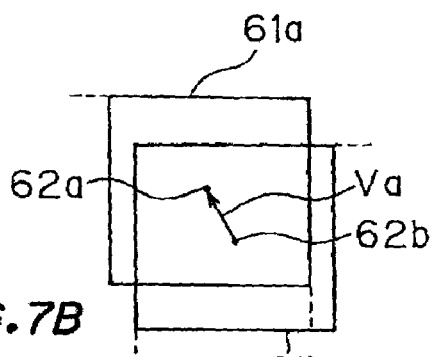
FIGS. 7A, 7B and 7C are drawings that explain the composing process of the frame.
Figure 7B:
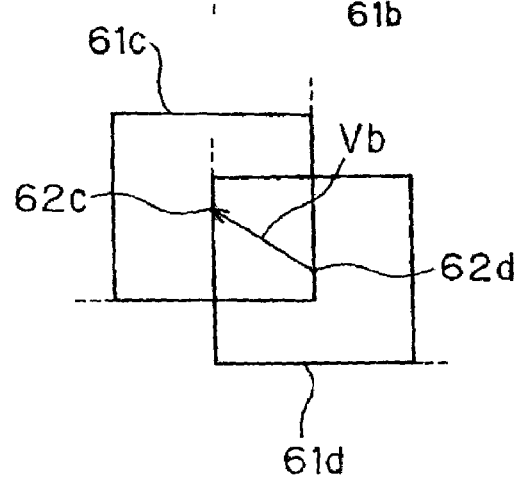
Figure 7C:
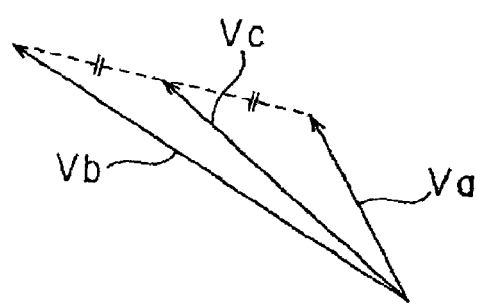

For example, it is supposed that, as a result of the pattern matching process of upper areas 61a and 61b in the adjacent frames (see frames $F_{0,0}$, $F_{1,0}$ of FIG. 6A) in the horizontal direction, the positions of the center pixel 62a and the center pixel 62b have an offset corresponding to vector Va as shown in FIG. 7A, and that, as a result of the pattern matching process of lower areas 61c and 61d in the adjacent frames 6 in the same manner as described above, the positions of the center pixel 62c and the center pixel 62d have an offset corresponding to vector Vb. In this case, as illustrated in FIG. 7C, vector Vc, which is the average between vector Va and vector Vb, is found. Then, vector Vc is used so as to correct positions in the joining process between the adjacent frames 6 so that it becomes possible to create a composite image with high precision in the joining process that is free from a feeling of incongruousness.

Figure 8A:
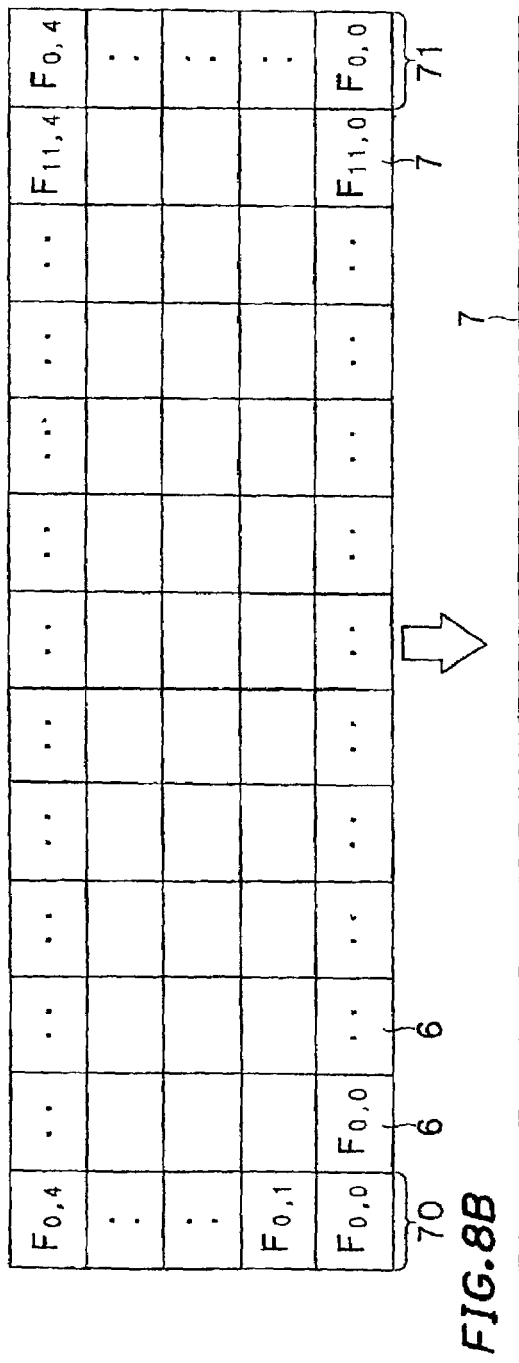
FIGS. 8A and 8B are drawings that explain a composite image formed by composing the frame.

FIG. 8A is a drawing that explains a continuous composite image formed by composing the frames 6 using the above-mentioned method.

A composite image 7 is equivalent to an image obtained by developing the image-pickup area 60 shown in FIG. 5 onto a plane, and as illustrated in FIG. 8A, 65 frames ($F_{0,0}$ to $F_{11,4}$) have their edges continuously joined to one after another. The composite image 7 has virtually 60 jointed frames 6 having picked up images. In other words, the same frames as the five frames 6 of the left edge 70 are joined to the right edge 71 in a duplicated manner. Thus, it is possible to simplify the image extracting processes in the vicinity of the two edges of the composite image 7.

With respect to the composite image 7, for example, supposing that one frame has 640×400 pixels, it has an image size of 7680×2000 pixels. Therefore, in the case of a request for altering the pickup direction from the user (which will be described later), for example, the shift corresponding to 1° in the pickup direction toward the horizontal direction Mx is equivalent to a shift of pixels corresponding to 21.33 (=7680/360) pixels/deg.

<Operation for Updating the Composite Image>

Figure 9:
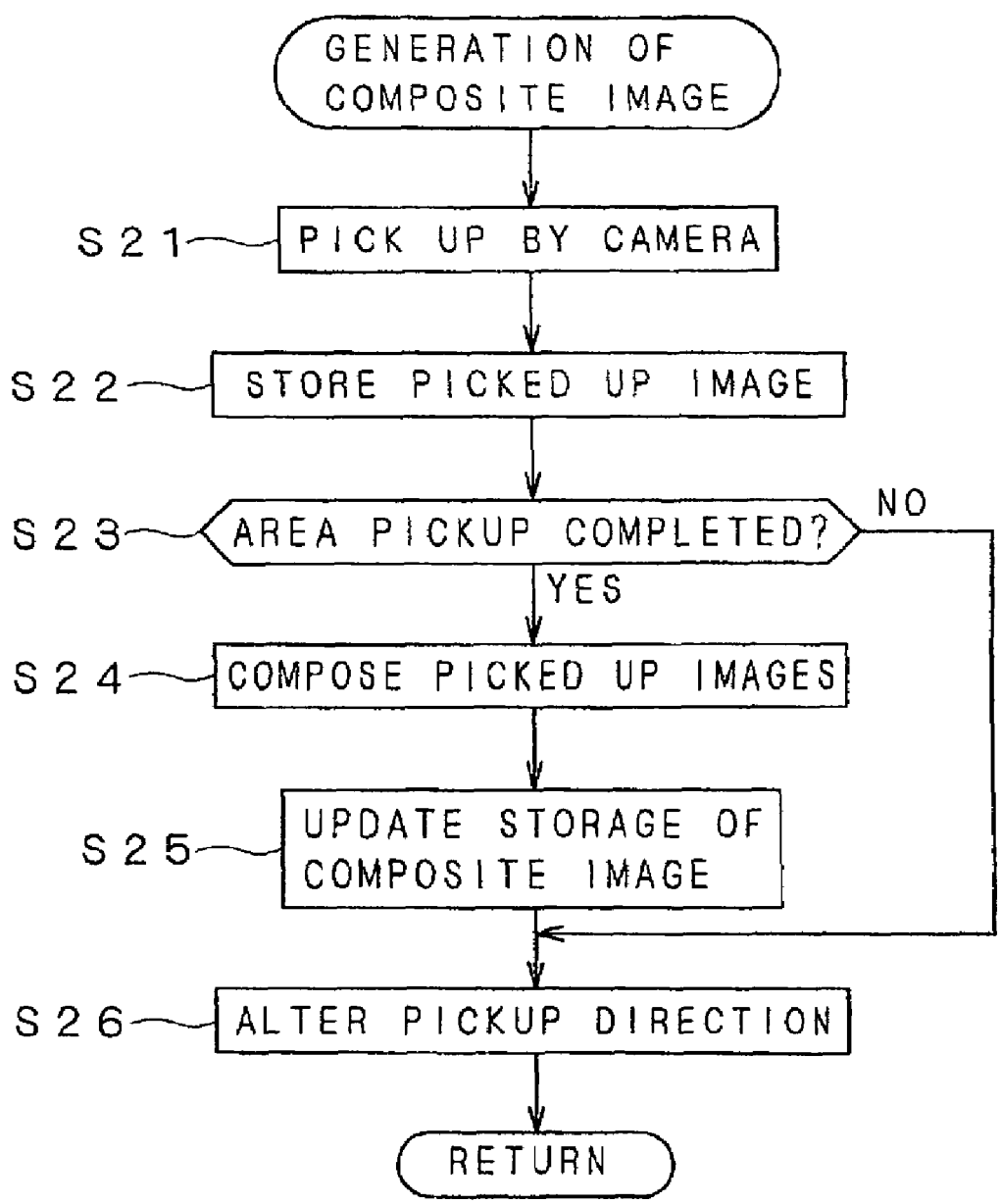
FIG. 9 is a flow chart that explains an operation for updating the composite image.

FIG. 9 is a flow chart that explains an operation for updating the composite image. This operation is similar to the operation for generating a composite image as shown in the flow chart of FIG. 4; therefore, the following description will discuss only the portions different from the operation for generating a composite image.

At step ST25, the composite image formed at step ST24 is overwritten on the image memory 42 of the server 4 and stored therein; that is, the storage is carried out in an updating manner. The generation of such a new composite image and the updating process are repeatedly carried out with predetermined time intervals so that the composite image is updated to the latest one regularly. This arrangement is effective in the case when a moving object is used as the subject.

<Operation for Transmitting Images>

Figure 10:
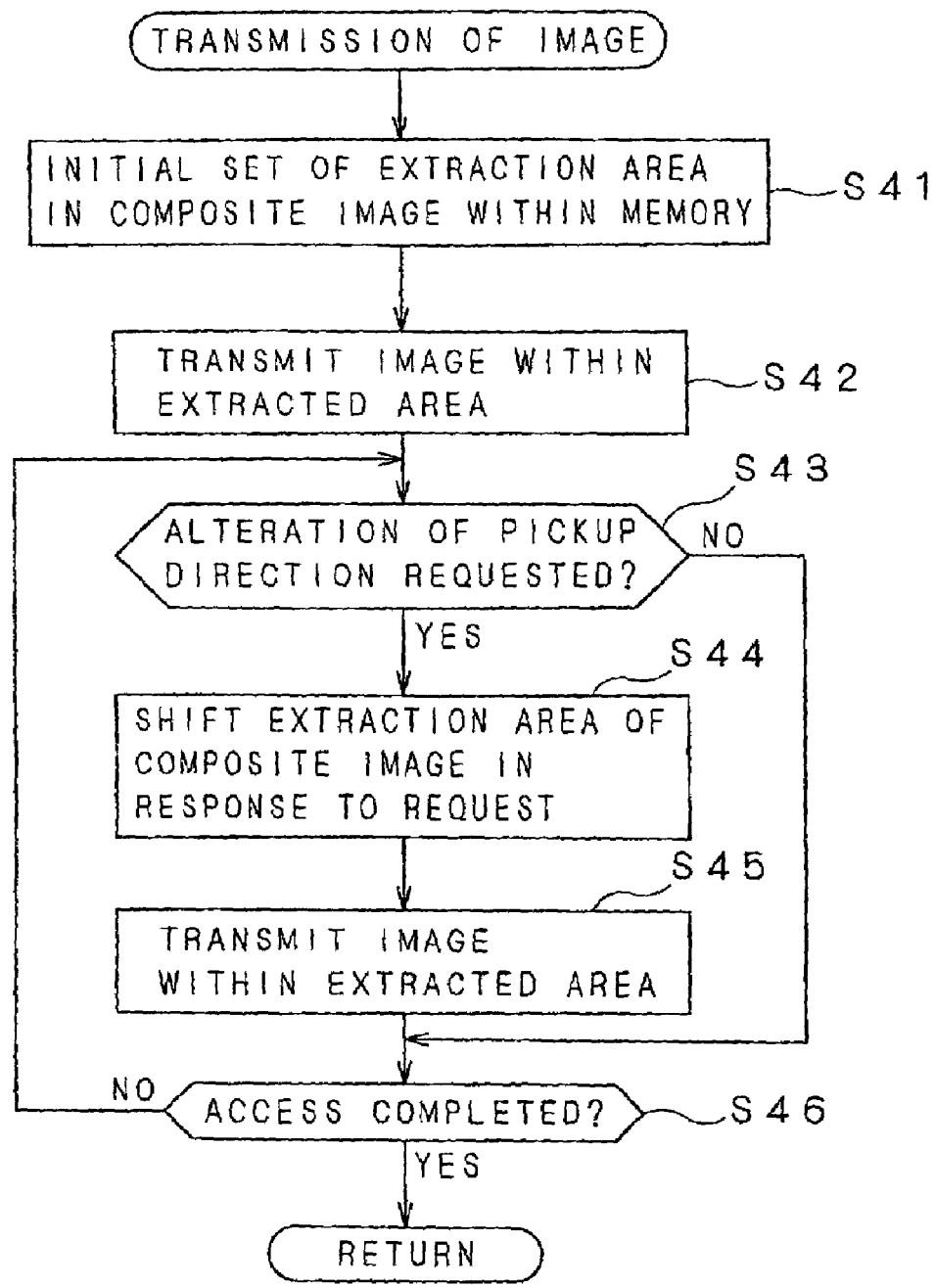
FIG. 10 is a flow chart that explains an operation for transmitting an image.

FIG. 10 is a flow chart that explains the operation for transmitting images.

At step S41, the initial setting for an extraction area extracted from the composite image 7 within the image memory 42 of the server 4 is carried out. In other words, a area 72 is extracted from the composite image 7 shown in FIG. 8B.

At step S42, the image of the extraction area 72 extracted at step S41 is transmitted to the user through the communication interface 46.

Figure 8B:
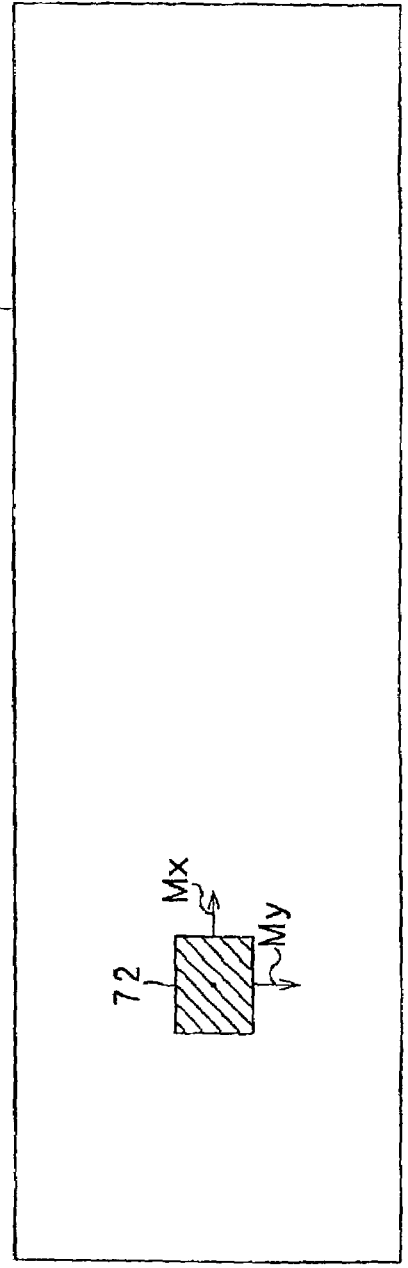

At step S43, a judgment is made as to whether or not there is a request from the user for altering the pickup direction, that is, whether or not there is a request for the shift of the area 72 shown in FIG. 8B. Here, if there is a request for the alteration, then the sequence proceeds to step S44, and if there is not, then the sequence proceeds to step S46.

At step S44, in response to the request for the alteration for the pickup direction, the extraction area 72 is shifted in the horizontal direction Mx and in the vertical direction My, as illustrated in FIG. 8B.

At step S45, the image within the extraction area 72 corresponding to the request for the alteration for the pickup direction is transmitted to the user through the communication interface 46.

At step S46, a judgment is made as to whether or not the access from the user to the server 4 through the communication line 9 has been completed. Here, upon completion of the access, the sequence proceeds to the step S3, and if it has not been completed, the sequence proceeds to step S43.

With the above-mentioned operation, even upon request from the user to alter the pickup direction, it is not necessary to mechanically alter the pickup direction of the live camera 2, and independent of the mechanical alteration, only the electrical image processing of the composite image 7 is carried out, with the result that the user is allowed to feel as if he or she were actually operating the live camera. In other words, even if a plurality of user's requests to alter the pickup direction, one live camera can deal with these requests; therefore, it is possible to effectively utilize the live camera, and consequently to construct a remote control camera system at low costs.

<Second Preferred Embodiment>

The essential construction of the remote control camera system in accordance with the second preferred embodiment of the present invention is the same as that of the remote control camera system 1 of the first preferred embodiment, except for portions related to the image memory 42.

Figure 11:
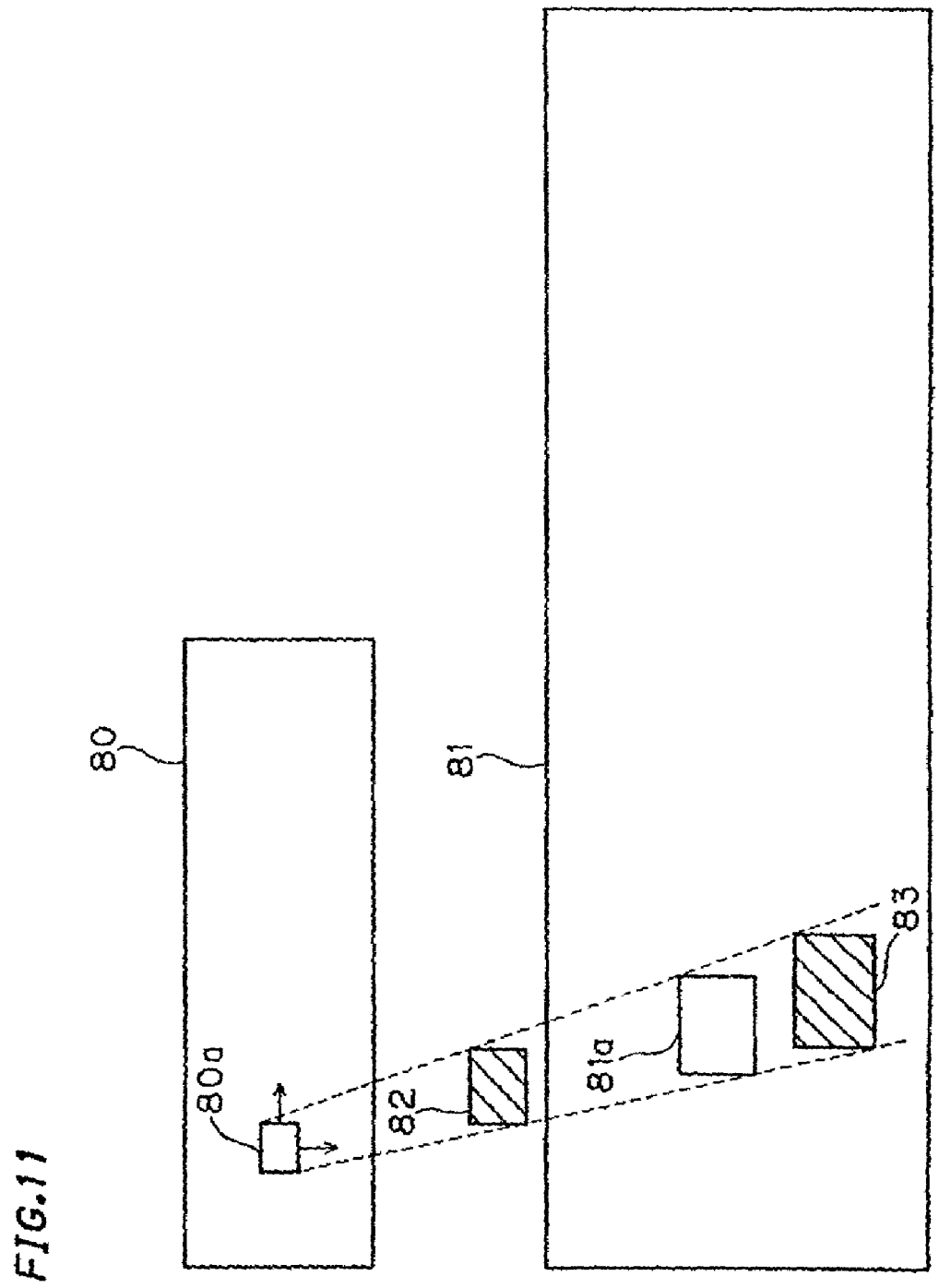
FIG. 11 is a drawing that explains the concept of an image processing operation in a remote control camera system in accordance with the second preferred embodiment.

FIG. 11 is a drawing that explains the concept of an image processing operation in a remote control camera system 1A in accordance with the second preferred embodiment.

In an image memory 42A of a server 4 in a remote control camera system 1A, a composite image 80 picked up at 1× zoom magnification and composed and a composite image 81 picked up at 6× zoom magnification and composed are stored. Here, the live camera 2 of the second preferred embodiment is capable of picking up images at one-power to six-power zoom.

<Operation of the Remote Control Camera System 1A>

The basic operation of the remote camera system 1A is the same as the basic operation of the remote control camera system 1 shown in the flow chart of FIG. 3.

<Operation for Forming Composite Images>

Figure 12:
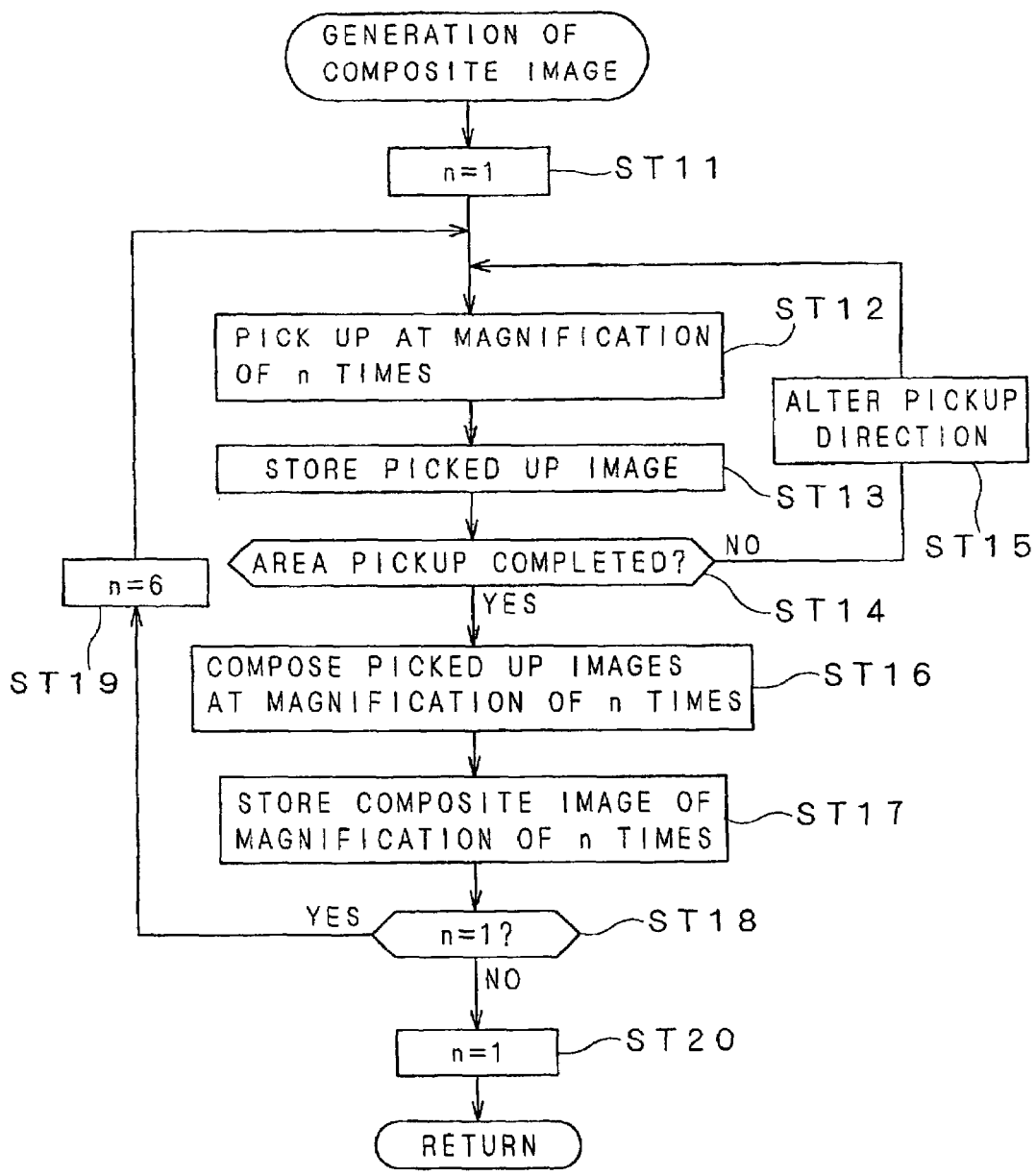
FIG. 12 is a flow chart that explains the operation of a composite image generation.

FIG. 12 is a flow chart that explains the operation of a composite image generation in the remote control camera system 1A.

At step ST11, n, which represents the ratio of zoom, is substituted by the initial value 1.

At step ST12, the frame 6 is picked up with the live camera 2 being set at zoom magnification of n times.

At step ST13, the frame 6 thus picked up is stored in the image memory 42 of the server 4.

At step ST14, with respect to the cylindrical pickup area 60 shown in FIG. 5, a judgment is made as to whether or not the image pickup has been completed by the live camera. If the image pickup has been completed, the sequence proceeds to step ST16, and if it has not been completed, the sequence proceeds to step ST15.

At step ST15, the direction-altering section 3 drives the live camera 2 so as to alter its pickup direction.

At step ST16, a plurality of images picked up at zoom magnification of n times in different directions are subjected to the same composing process as the remote control camera system 1 of the first preferred embodiment, with the result that a composite image 80(81) of zoom magnification of n times is formed as shown in FIG. 11.

At step ST17, the composite image 80(81) of zoom magnification of n times composed at the step ST16 is stored in the image memory 42 of the server 4.

At step ST18, a judgment is made as to whether or not n is 1. If n is equal to 1, the sequence proceeds to step ST19, and if n is not 1, that is, if n is equal to 6, the sequence proceeds to step ST20.

At step ST19, n is substituted by 6. Thus, after the composite image of 1× zoom magnification has been formed and stored, the operation for generating a composite image of 6× zoom magnification is initiated.

At step ST20, n is substituted by 1. Here, the value 1 is set as the initial value of n for an operation for updating the composite image, which forms a post-process.

<Operation for Updating the Composite Image>

Figure 13:
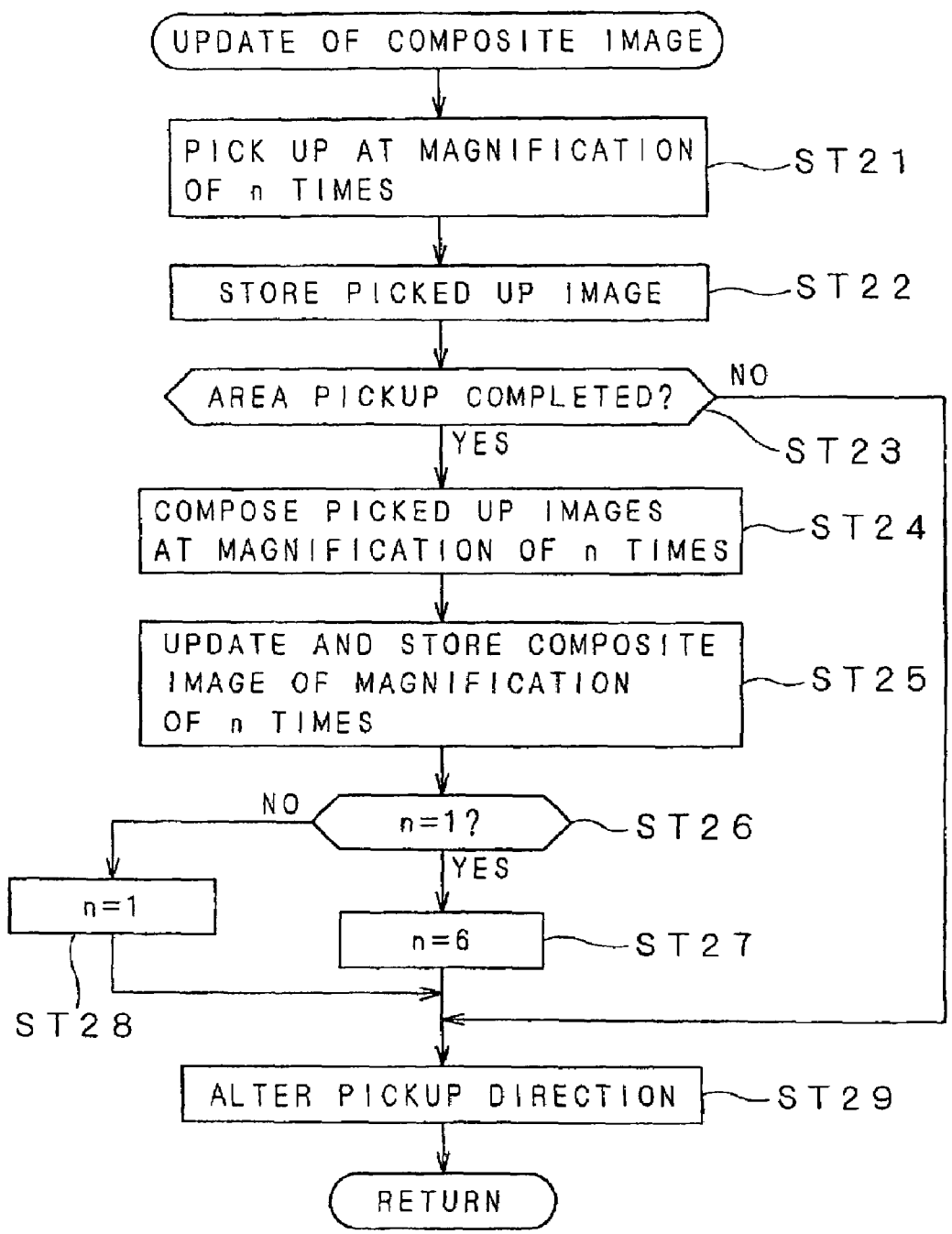
FIG. 13 is a flow chart that explains an operation for updating the composite image.

FIG. 13 is a flow chart that explains an operation for updating the composite image. This operation is similar to the operation for generating a composite image as shown in the flow chart of FIG. 12; therefore, the following description will discuss only the portions different from the operation for generating a composite image.

At step ST25, the composite image of zoom magnification of n times formed at step ST24 is overwritten on the image memory 42 of the server 4 and stored therein; that is, the storage is carried out in an updating manner. So that the composite image of zoom magnification of n times is updated to the latest one regularly. This arrangement is effective in the case when a moving object is used as the subject.

Moreover, at steps ST26 to 28, a judgment is made as to whether or not n=1, and if n=1, n is substituted by 6, while if n is not equal to 1, n is substituted by 1; thus, composite images at different zoom ratios, that is, 1× zoom magnification and 6× zoom magnification, are alternately generated.

<Operation for Transmitting Images>

Figure 14:
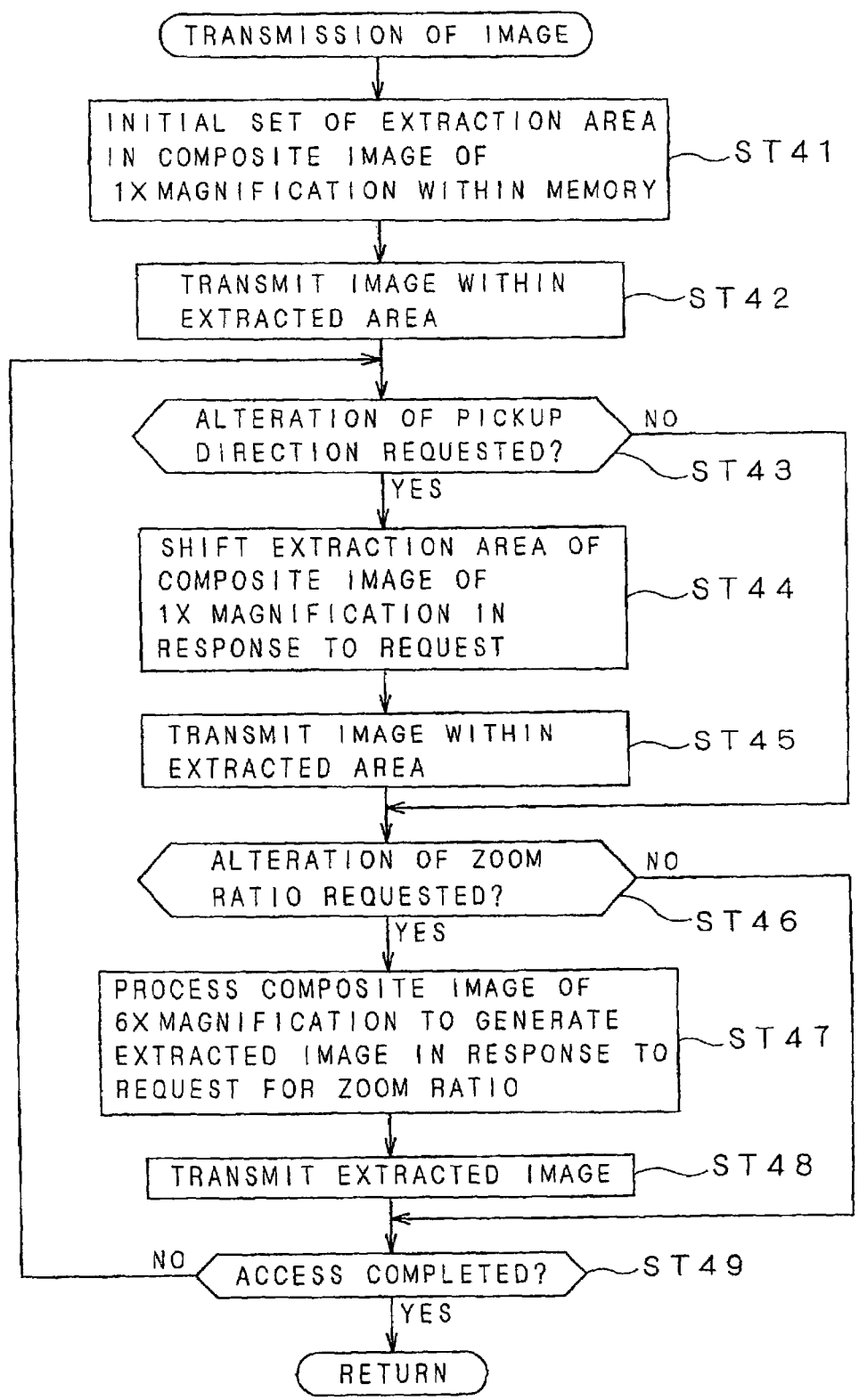
FIG. 14 is a flow chart that explains an operation for transmitting an image.

FIG. 14 is a flow chart that explains the operation for transmitting images.

At step ST41, the initial setting for an extraction area of the composite image 80 of 1× magnification within the image memory 42 of the server 4 is carried out. In other words, a area 80a is extracted from the composite image 80 shown in FIG. 11.

At step ST42, the image of the extraction area 80a extracted at step ST41 is transmitted to the user through the communication interface 46.

At step ST43, a judgment is made as to whether or not there is a request from the user for altering the pickup direction, that is, whether or not there is a request for the shift of the area 80a. Here, if there is a request for the alteration, then the sequence proceeds to step ST44, and if there is not, then the sequence proceeds to step ST46.

At step ST44, in response to the request for the alteration for the pickup direction, the extraction area 80a is shifted in the same manner as in the first preferred embodiment.

At step ST45, the image within the extraction area 80a corresponding to the request for the alteration for the pickup direction is transmitted to the user through the communication interface 46.

At step ST46, a judgment is made as to whether or not there is a request for the alteration for the zoom ratio from the user. Here, upon receipt of the request, the sequence proceeds to the step S44, and if there is no request, the sequence proceeds to step S46.

At step ST47, in response to the request for the alteration of the zoom ratio, the image within the area 81a cut out from the composite image 81 of 6× zoom magnification is subjected to the image processing so as to generate an extracted image 82(83). In other words, as illustrated in FIG. 11, in the case of 1× to 6× magnification, the image within the cut-out area 81a in the composite image 81 of 6× zoom magnification is reduced through an image processing to generate a desired extraction image 82. Moreover, in the case of not less than 6× zoom magnification, the image within the cut-out area 81a in the composite image 81 of 6× zoom magnification is enlarged through an image processing to generate a desired extracted image 83. In this case, the composite image of 6× zoom magnification having the maximum magnification is selected and used for the image processing; therefore, since the image is reduced in the case of an intermediate magnification (1× to 6×), it is possible to avoid degradation in the image quality.

At step ST48, the extracted image 82(83) formed at step S47 is transmitted to the user through the communication interface 46.

At step ST49, a judgment is made as to whether or not the access to the server 4, made by the user through the communication line 9, has been completed. Here, if the access has been completed, the sequence proceeds to step S3, and if it has not been completed, the sequence proceeds to step ST43.

With the above-mentioned operation, the same effects as those of the first preferred embodiment are also obtained in the remote control camera system 1A. Moreover, since the zoom ratio can be altered, it is possible to deal with a high-level request from the user.

<Modified Examples>

⊙ With respect to the composite image 7 in the first preferred embodiment, the frames which have been picked up at the maximum magnification may be joined to each other so as to generate the image. In this case, if there is a request for alteration of the zoom magnification from the user, the image processing may be applied to the composite image having the maximum magnification so as to generate an extracted image.

⊚ With respect to the zoom ratio in the second preferred embodiment, not limited to the two kinds of combinations of 1× and 6× magnification, for example, three kinds of combinations of, for example, 1×, 3× and 6×, or combinations of 4 kinds or more, may be used.

⊚ With respect to the composite images of the second preferred embodiment, it is not necessary to use frames that have been picked up by the live camera by actually altering the magnification, and based upon a composite image of the frame picked up at the maximum magnification, the composite image may be reduced to a plurality of images having different magnifications such as ½ and ¼ with respect to the maximum magnification.

Figure 15A:
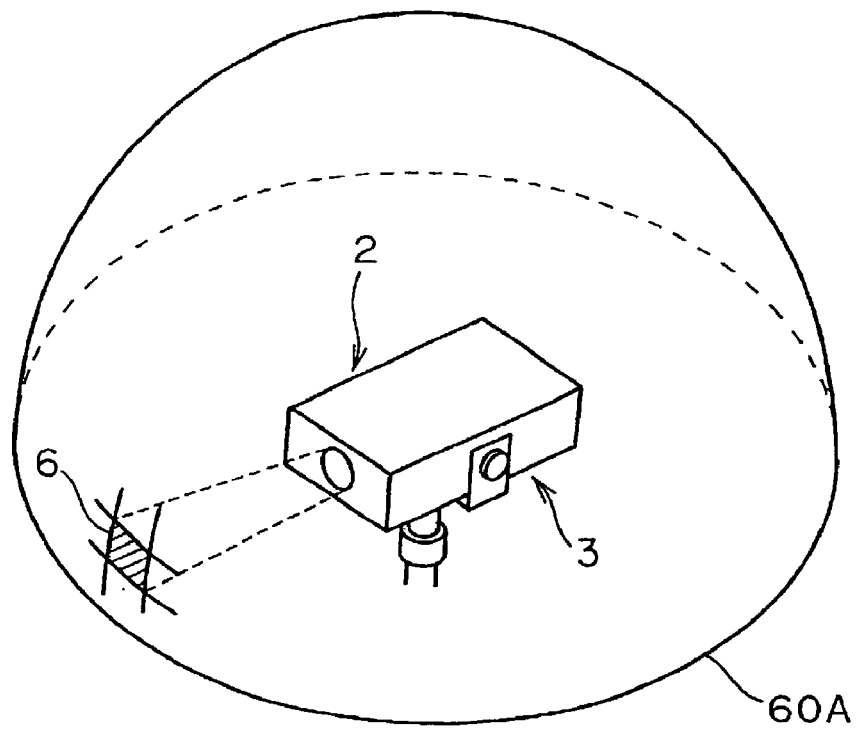
FIGS. 15A and 15B are drawings that show an image pickup area having a dome shape in accordance with a modified example.

⊚ With respect to the pickup area related to the above-mentioned preferred embodiments, it is not necessary to use the cylindrical shape as shown in FIG. 5, and a dome-shaped pickup area 60A as shown in FIG. 15A may be used.

Figure 15B:
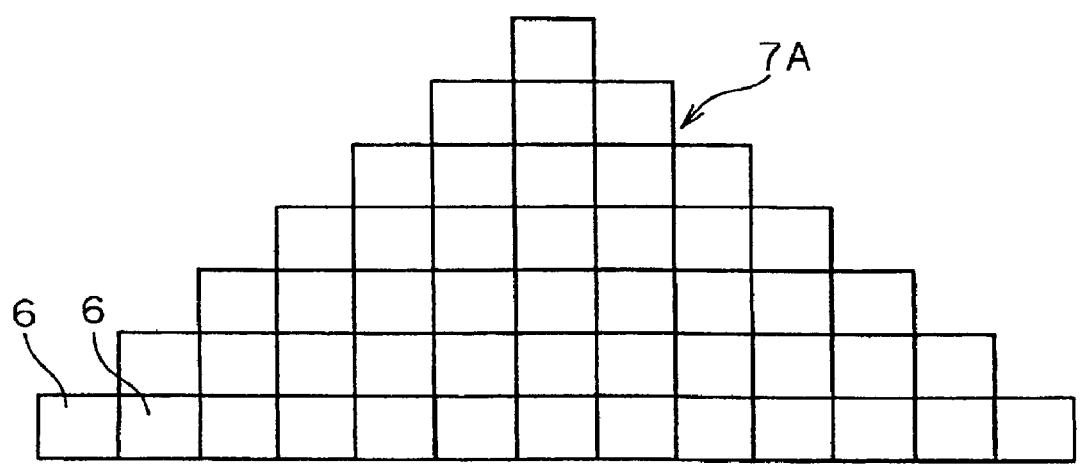

In this case, with respect to the resulting composite image 7A corresponding to the composite image 7 shown in FIG. 8A, frames 6 are composed in a manner as illustrated in FIG. 15B.

⊚ With respect to the composite images in the above-mentioned preferred embodiments, among all the area to be picked up, those frames that have no changes in the motion (for example, the ceiling portion, etc. of a room) may be omitted after they have once been picked up, and the frames other than those frames may be repeatedly picked up so as to update the composite image.

⊚ With respect to the composite images in the above-mentioned preferred embodiments, it is not necessary to carry out the composing process thereof in the server, and the composing process may be executed in the live camera, and the data may be transferred to the server.

⊚ With respect to the number of the live cameras in the above-mentioned preferred embodiments, it is not necessary to limit the number to one; and two or more cameras may be installed. The application of a plurality of live cameras makes it possible to share the load in collecting picked-up images for generating a composite image, and consequently to readily form the composite image.

Figure 16:
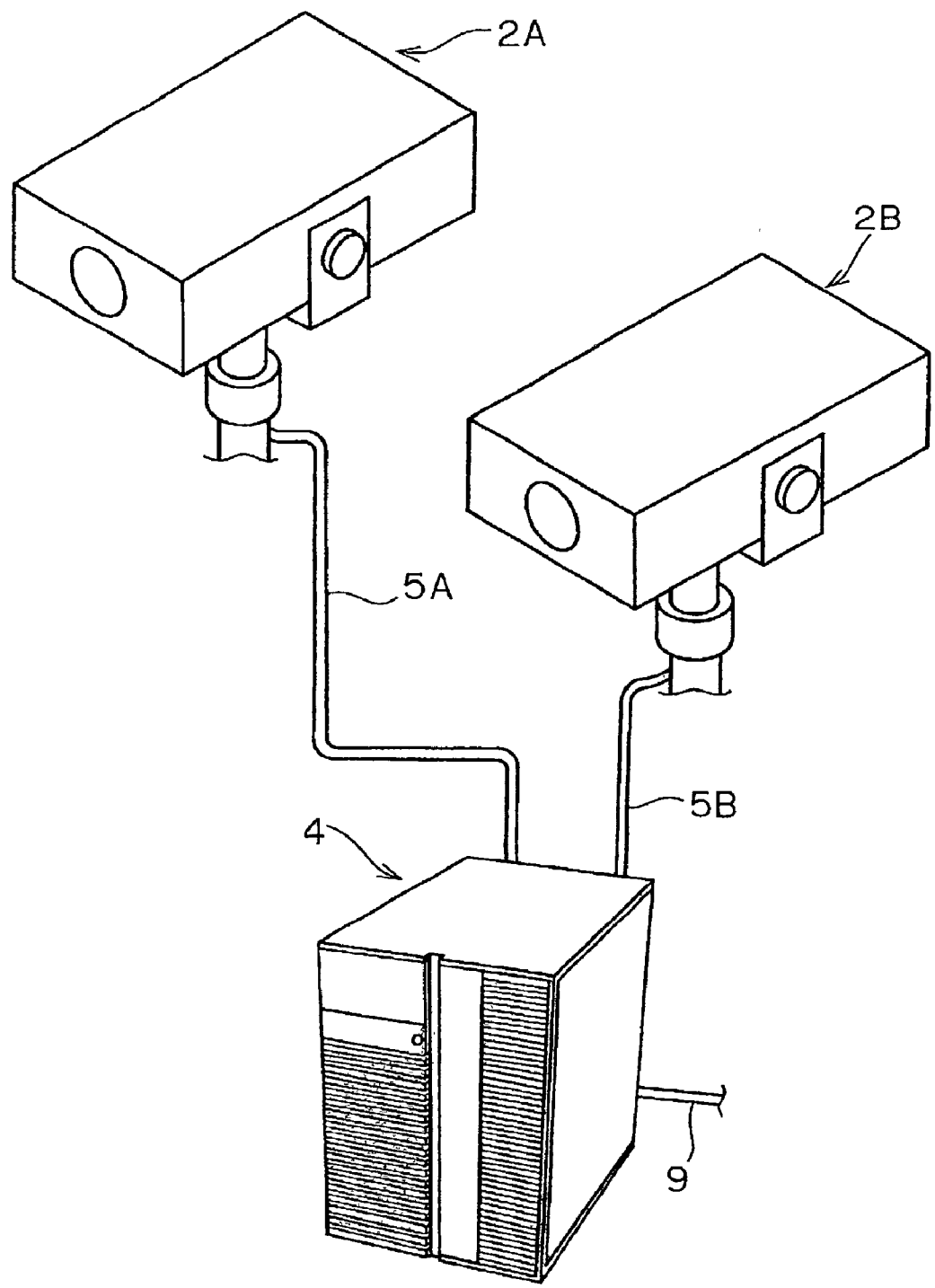
FIG. 16 is a drawing that shows a live image camera and a composite image camera that in accordance with the modified example.

⊚ With respect to the live cameras in the above-mentioned preferred embodiments, as illustrated in FIG. 16, in addition to the camera 2A for composing the image, another camera 2B for transmitting live (actual) image just picked up directly to the user may be installed separately. This camera 2B makes it possible to transmit an image without a time lag, and consequently to easily follow a moving subject, etc. by the camera.

Figure 17A:
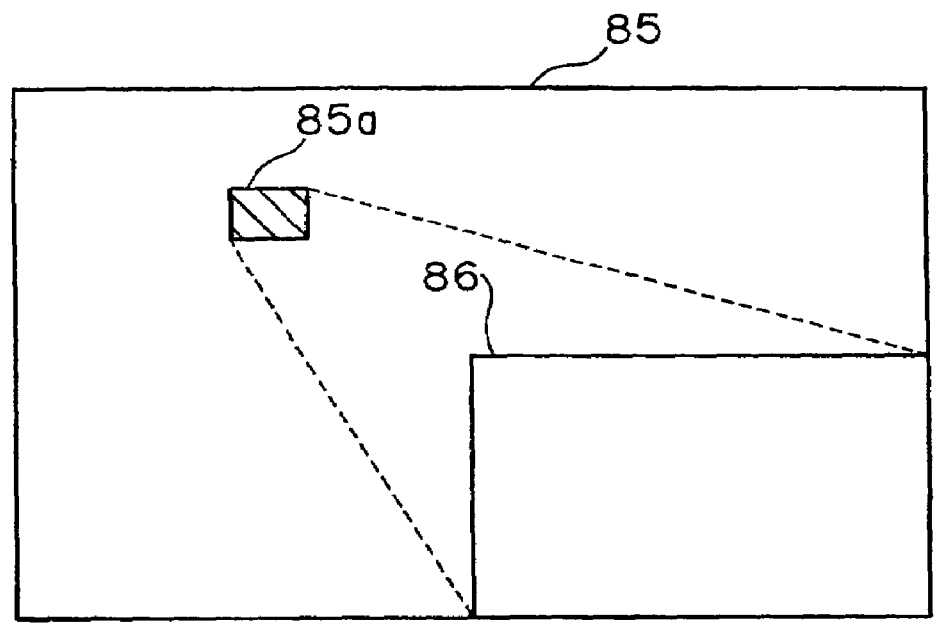
FIGS. 17A and 17B are drawings that show the combination of the live image and the composite image in accordance with the modified example.
Figure 17B:
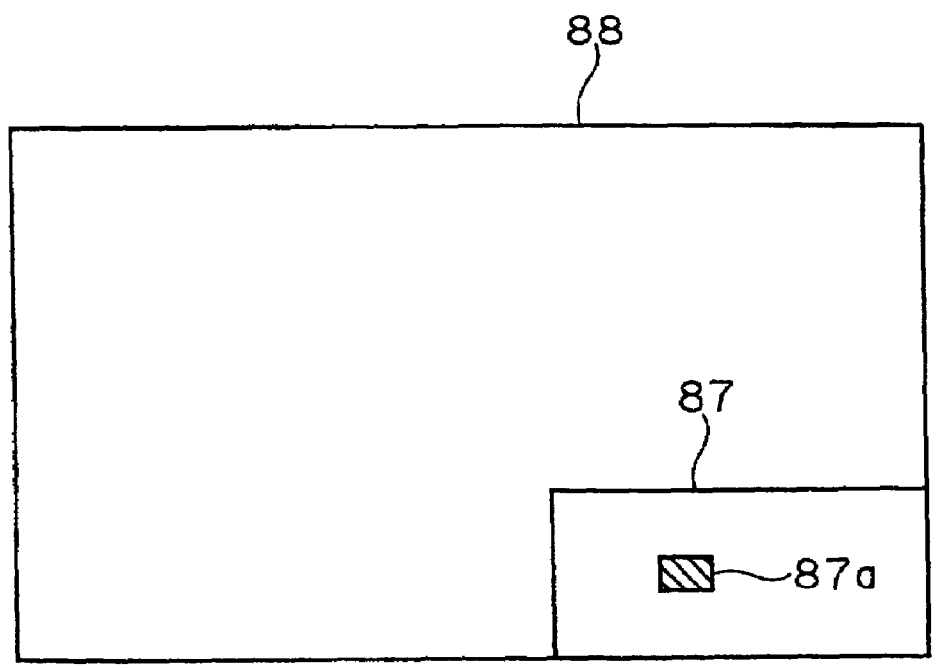

In this case, the live image and the composite image stored in the image memory may be combined and transmitted. More specifically, as illustrated in FIG. 17A, a composite image 85 and a live image 86 provided in a manner so as to enlarge a partial image 85a of the composite image 85 may be combined, or as illustrated in FIG. 17B, a composite image 87 and a live image 88 provided in a manner so as to enlarge a partial image 87a of the composite image 85 may be combined.

Figure 19:
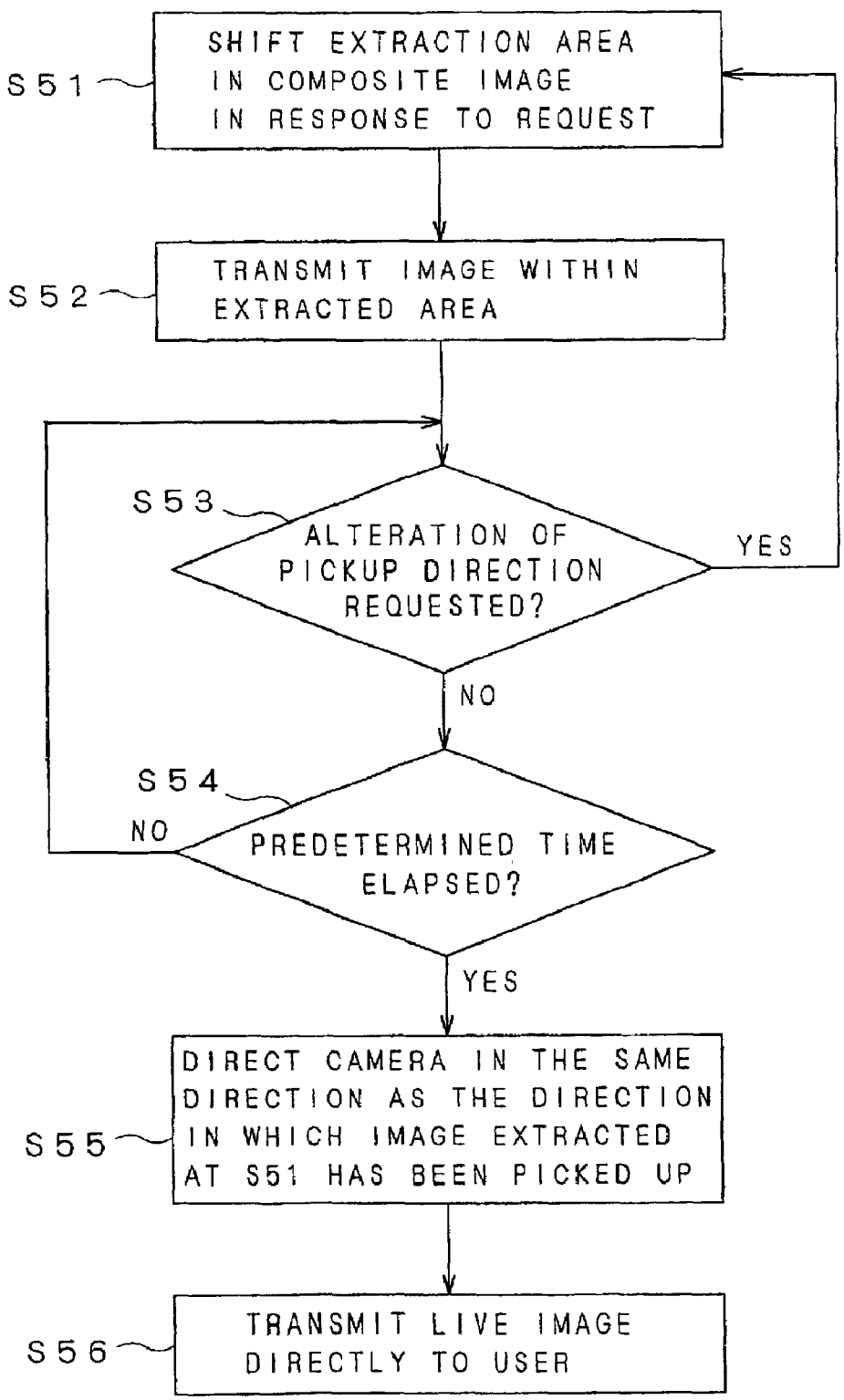
FIG. 19 is a flow chart that explains an operation for picking up a live image.

Moreover, in the case when there is not any request for altering the pickup direction for a predetermined period of time, it is judged that the user wishes to view in the constant direction, and after having directed the camera in the direction corresponding to the image last extracted and transmitted, live images in the corresponding direction picked up by the camera may be transmitted to the user. In this case, the camera used for forming the composite image may be sharedly used for this purpose, or as illustrated in FIG. 16, in the case of the application of a plurality of cameras, one camera may be assigned for the transmission of live images. FIG. 19 shows a flow chart for explaining this operation.

⊚ With respect to the lens driving mechanism in the live camera in the above-mentioned preferred embodiments, it is not inevitable to use a motor; and for example, a piezoelectric element may be utilized as described below.

Figure 18:
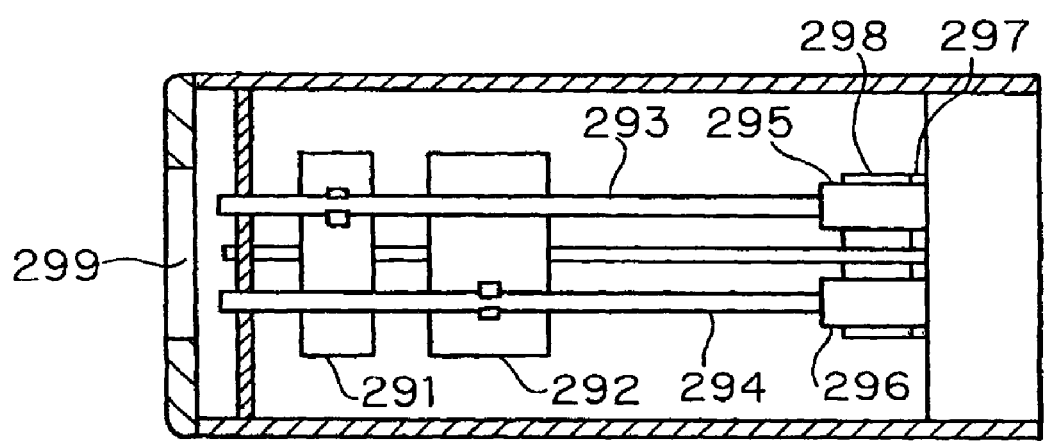
FIG. 18 is a cross-sectional view that shows an essential structure of a camera using a piezoelectric element in accordance with the modified example.

FIG. 18 is a cross-sectional view that shows an essential structure of a camera in which piezoelectric elements are used.

A camera 29 is provided with a zoom lens section 291, a focus lens section 292, a driving shaft 293 connected to the zoom lens section 291, and a driving shaft 294 connected to the focus lens section 292. Moreover, the camera 29 is provided with piezoelectric (conversion) elements 295 and 296 connected to the respective ends of the driving shafts 293 and 294, a CCD 297 and an optical low-pass filter 298 placed on the CCD 297. These piezoelectric elements 295 and 296 have such a characteristic that upon application of a driving voltage, they expand and shrink in the driving axis direction.

Light that has been made incident on the pickup window 299 is transmitted through the zoom lens section 291, the focus lens section 292 and the optical low-pass filter 298, and made incident on the CCD 297. At this time, the piezoelectric elements 295 and 296 are driven so that the zoom lens section 291 and the focus lens section 292 are shifted; thus, an image of a subject is properly formed on the CCD 297.

With this arrangement, it becomes possible to provide a small-size, light-weight camera.

While the invention has been described in detail, the foregoing description is in all aspects illustrative and not restrictive. It is understood that numerous other modifications and variations can be devised without departing from the scope of the invention.

What is claimed is:

1. A remote control camera system which is remote-controlled by a plurality of users, said remote control camera comprising:
an image pickup device capable of picking up a live image and outputting said live image to outside;
a changing element for changing a pickup direction of said image pickup device;
a composing element for forming composite image information by continuously composing a plurality of pieces of image information picked up by said image pickup device in different image pickup directions;
a memory for storing said composite image information;
an extraction element for forming extracted image information derived from said composite image information in response to a request from outside;
an output device for outputting said extracted image information;
a controlling element for repeating an operation of forming a composite image and storing said composite image by overwriting said memory at a given timing; and
live image output device for outputting a live image, wherein,
in the case when there is a request from outside for changing said pickup direction while picking up and outputting said live image, said controlling element obtains said extracted image information derived from said composite image information and outputs said extracted image information in response to said request from outside without changing said pickup direction of said image pickup device, and in the case when there is not any request from outside for a predetermined period of time, said image pickup device is directed in the direction in which an extracted image lastly output was picked up, and a live image picked up by said image pickup device is output through said live image output device.

2. A remote control camera system which is remote-controlled by a plurality of users, said remote control camera comprising:

an image pickup device capable of picking up a live image and outputting said live image to outside, said image pickup device including a plurality of cameras;

a changing element for changing a pickup direction of said image pickup device;

a composing element for forming composite image information by continuously composing a plurality of pieces of image information picked up by said image pickup device in different image pickup directions;

a memory for storing said composite image information;

an extraction element for forming extracted image information derived from said composite image information in response to a request from outside;

an output device for outputting said extracted image information;

a controlling element for repeating an operation of forming a composite image and storing said composite image by overwriting said memory at a given timing; and live image output device which, in response to said request from outside, outputs live image information picked up by at least one camera among said plurality of cameras as live images, wherein in the case when there is not any request from outside for a predetermined period of time, said at least one camera is directed in the direction in which an extracted image lastly output was picked up, and live image information picked up by said at least one camera is output through said live image output device.

* * * * *

UNITED STATES PATENT AND TRADEMARK OFFICE
CERTIFICATE OF CORRECTION

PATENT NO. : 6,982,749 B2
APPLICATION NO. : 09/781235
DATED : January 3, 2006
INVENTOR(S) : Naoki Matsui It is certified that error appears in the above-identified patent and that said Letters Patent is hereby corrected as shown below:

Title Page:
 Item "(73) Assignee:" Change "Sanyo Electric Co., Ltd., Osaka (JP)" to -- MINOLTA CO., LTD., Osaka (JP) --.

Signed and Sealed this

Twenty-first Day of August, 2007

JON W. DUDAS
*Director of the United States Patent and Trademark Office*